United States Patent
Santoki et al.

(10) Patent No.: US 6,746,786 B2
(45) Date of Patent: Jun. 8, 2004

(54) MAGNETIC RECORDING MEDIUM AND PROCESS FOR PRODUCING THE SAME

(75) Inventors: Teruaki Santoki, Ohtake (JP); Yasuo Kakihara, Yokohama (JP); Mitsuru Matsuura, Ube (JP); Setsuo Yamamoto, Ube (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 80 days.

(21) Appl. No.: 09/976,296

(22) Filed: Oct. 15, 2001

(65) Prior Publication Data
US 2002/0068193 A1 Jun. 6, 2002

(30) Foreign Application Priority Data
Oct. 17, 2000 (JP) ........................................ 2000-317222

(51) Int. Cl.$^7$ .............................. G11B 5/66; G11B 5/70; B32B 19/00
(52) U.S. Cl. .............................. 428/694 T; 428/694 TS; 428/900; 428/697; 428/699; 428/701
(58) Field of Search ....................... 428/694 T, 694 TS, 428/900, 697, 699, 701

(56) References Cited

U.S. PATENT DOCUMENTS

| 4,975,324 A | | 12/1990 | Torii et al. .................. 428/329 |
| 5,094,896 A | * | 3/1992 | Morita et al. .............. 428/65.4 |
| 6,525,908 B1 | * | 2/2003 | Usuki .......................... 360/133 |

FOREIGN PATENT DOCUMENTS

| EP | 0 586 142 A1 | 3/1994 |
| EP | 0 673 021 | 9/1995 |
| EP | 0 945 858 A1 | 9/1999 |
| JP | 01 298029 | 12/1989 |
| JP | 03 078114 | 4/1991 |

* cited by examiner

*Primary Examiner*—Holly Rickman
(74) *Attorney, Agent, or Firm*—Nixon & Vanderhye P.C.

(57) ABSTRACT

A magnetic recording medium, comprises a substrate; and a Co-containing spinel-type iron oxide thin film formed on the substrate, having a Co content of 1 to 20 mol % based on Fe, a coercive force value of not less than 159 kA/m (2,000 Oe), a thickness of 5 to 200 nm, a center line average height Ra of 0.1 to 0.8 nm and a maximum height (Rmax) of not more than 10 nm. The magnetic recording medium is capable of exhibiting a relatively high coercive force, especially a coercive force of not less than 159 kA/m (2,000 Oe) despite as small a film thickness as not more than 200 nm, and an excellent surface smoothness.

6 Claims, 1 Drawing Sheet

MAGNETIC RECORDING MEDIUM AND PROCESS FOR PRODUCING THE SAME

BACKGROUND OF THE INVENTION

The present invention relates to a magnetic recording medium and a process for producing the magnetic recording medium, and more particularly, to a magnetic recording medium capable of exhibiting a relatively high coercive force, especially a coercive force of not less than 159 kA/m (2,000 Oe) despite as small a film thickness as not more than 200 nm, and an excellent surface smoothness, and a process for producing the magnetic recording medium at one step.

In recent years, in magnetic recording apparatuses such as hard disk devices, there has been a remarkable tendency that information devices or systems used therefor are miniaturized and required to have a high reliability. With such a recent tendency, in order to deal with a large capacity data, there is an increasing demand for providing magnetic recording media on which information can be stored with a high density.

In order to satisfy such requirements, the magnetic recording media have been strongly required to have not only a high coercive force, but also reduce a distance between a magnetic head and a magnetic recording layer (magnetic spacing).

As magnetic recording media having a high coercive force, there is widely known those comprising a substrate and a magnetic thin film formed on the substrate.

The magnetic thin films which have been already practically used in magnetic recording media, are generally classified into magnetic oxide thin films composed of iron oxides such as magnetite, maghemite, etc. ("Technical Report of the Institute of Electronics, Information and Communication Engineers", published by the of Electronics, Information and Communication Engineers, (1981) MR81–20, pp. 5 to 12; "Ceramics", published by Japan Institute of Ceramics, (1986) Vol. 24, No. 1, pp. 21 to 24; and Japanese Patent Publication (KOKOKU) Nos. 51-4086(1976) and 5–63925(1993)), and magnetic alloy thin films composed of Co—Cr alloy or the like.

The magnetic oxide thin films composed of iron oxides are excellent in corrosion resistance due to inherent properties of the oxides. As a result, the magnetic oxide thin films can show an excellent stability independent of change with passage of time, and less change in magnetic properties with passage of time. Further, since oxides exhibit a higher hardness than that of metals, it is not necessary to form an overcoat thereon. As a result, it becomes possible to reduce the magnetic spacing of the obtained magnetic recording medium as compared to those magnetic recording media using the magnetic alloy thin film. Therefore, the magnetic oxide thin film is optimum for the production of high-density magnetic recording media.

It has been attempted to enhance a coercive force of the thin iron oxide film by incorporating cobalt thereinto. However, with the increase in cobalt content, the iron oxide thin film tends to be deteriorated in stability independent of change with passage of time due to adverse influences of heat or the like.

Meanwhile, the present inventors have already proposed a maghemite thin film which can exhibits a high coercive force even with a less cobalt content by controlling the spacing of specific plane of the maghemite thin film (Japanese Patent Application Laid-Open (KOKAI) Nos. 11-110731(1999) and 11-110732(1999)).

On the other hand, the magnetic alloy thin films composed of Co—Cr alloy or the like, have a coercive force as high as not less than about 159 kA/m (2,000 Oe). However, these alloy materials tend to be readily oxidized in themselves and, therefore, tend to be deteriorated instability independent of change with passage of time as well as magnetic properties.

In order to prevent the deterioration of magnetic properties due to the oxidation, a overcoat composed of diamond-like carbon, $SiO_2$ or the like, having a thickness of usually about 10 to 20 nm, is formed on the surface of the magnetic alloy thin film, resulting in undesired increase in magnetic spacing corresponding to the thickness of the overcoat.

In magnetic recording media, in order to reduce the magnetic spacing, it is necessary to reduce the flying height of a magnetic head as far as possible, and always cause the magnetic head to be flying stably. In conventional hard disk drive, magnetic recording media used therefor have been required to have a certain surface roughness in order to prevent the magnetic head from being absorbed thereonto owing to a meniscus force therebetween upon stopping the magnetic head. At the present time, as a result of current improvement in these hard disk systems, magnetic recording media have been no longer required to show such a surface roughness for preventing the magnetic head from being absorbed thereonto. On the contrary, it has been required that a magnetic thin film used in these magnetic recording media exhibits a more excellent surface smoothness.

Also, it is known that the non-smooth surface of magnetic recording media causes media noise. In order to eliminate such a media noise, it is necessary to reduce a surface roughness of the magnetic thin film.

At present, in magnetic recording media using a magnetic oxide thin film, with the recent tendency toward high recording density, the magnetic oxide thin film is required to have a very small thickness such as not more than 200 nm. For this reason, the surface properties of the magnetic thin film are considerably influenced by surface properties of a substrate. As a result, it has been required not only to use such a substrate having an excellent surface smoothness, but also to develop techniques for further smoothening the surface of the magnetic thin film.

Hitherto, as methods of producing iron oxide thin films, there are known (1) a method of forming a magnetite thin film on a substrate, and then oxidizing the magnetite thin film at a temperature of not less than 300° C.; (2) a method of forming a film composed of $\gamma\text{-}Fe_2O_3$, $Fe_3O_4$ or $FeO_x$ ($4/3<x<3/2$) using $\gamma\text{-}Fe_2O_3$, $Fe_3O_4$ or $FeO_x$ ($4/3<x<3/2$) as a target (Japanese Patent Publication (KOKOKU) Nos. 62-49724(1987) and 6-61130(1994)); (3) a method of forming a cobalt-containing spinel-type iron oxide thin film directly on a substrate by sputtering a target while irradiating the substrate with a high-density oxygen plasma (Japanese Patent Application Laid-Open (KOKAI) Nos. 1-298029 (1989) and 3-78114 (1991)); or the like.

Presently, it has been strongly demanded to provide magnetic recording media comprising a spinel-type iron oxide thin film capable of showing a high coercive force and an excellent surface smoothness despite its small thickness. However, such magnetic recording media satisfying these requirements have not been obtained until now.

Namely, in the above method (1) for producing the iron oxide thin film, the obtained magnetite thin film is taken out into atmosphere and further subjected to oxidation treatment at a temperature of 300 to 450° C., thereby obtaining the maghemite thin film. In this method, since it is necessary to conduct the heat-treatment at a temperature as high as not less than 300° C., there arises such a problem that the obtained thin film is deteriorated in magnetic properties due to migration from the substrate or the like. Therefore, it is required to select the material of the substrate from those having an excellent heat resistance, so that only limited substrates are usable therefor. In addition, since the magnetite thin film is taken out into atmosphere, there also arise problems such as contamination thereof.

In the method (2), the obtained iron oxide thin film shows a poor coercive force and, therefore, unsatisfactory in magnetic properties.

In the method (3) for producing the iron oxide thin film as described in Japanese Patent Application Laid-Open (KOKAI) No. 1-298029(1989), the spinel-type iron oxide thin film is formed by irradiating the substrate with a high-density oxygen plasma generated from an ECR plasma device while sputtering each metal target. The obtained thin film exhibits a coercive force as high as 191 kA/m (2,400 Oe), but has a very large thickness of 750 nm. Further, since the spinel-type iron oxide thin film is intended for use in magneto-optical recording media, the surface smoothness thereof is not taken into consideration. Therefore, the spinel-type iron oxide thin film obtained by the method (3) is unsatisfactory in aimed surface smoothness. Further, in Japanese Patent Application Laid-Open (KOKAI) No. 3-78114(1991), it is described that iron oxide is produced by sputtering an oxide target while irradiating the oxide target with ECR plasma. However, the obtained iron oxide shows a low coercive force and, therefore, is unsatisfactory in magnetic properties.

As a result of the present inventors' earnest studies for solving the above problems, it has been found that by sputtering a metal target or a metal alloy target in an atmosphere of plasma activated by electron cyclotron resonance (ECR) microwave, the obtained Co-containing spinel-type iron oxide thin film can exhibit a Co content of 1 to 20 mol % based on Fe, a coercive force of not less than 159 kA/m (2,000 Oe), a film thickness of 5 to 200 nm, a center line average height (Ra) of 0.1 to 0.8 nm and a maximum height (Rmax) of not more than 10 nm. The present invention has been attained based on the above finding.

SUMMARY OF THE INVENTION

An object of the present invention is to provide a magnetic recording medium capable of exhibiting a coercive force of not less than 159 kA/m (2,000 Oe), a film thickness of 5 to 200 nm, a center line average height (Ra) of 0.1 to 0.8 nm and a maximum height (Rmax) of not more than 10 nm.

Another object of the present invention is to provide a process for producing a magnetic recording medium having a relatively high coercive force, especially not less than 159 kA/m (2,000 Oe) despite as small a film thickness as not more than 200 nm, and an excellent surface smoothness, only at one step.

To accomplish the aims, in a first aspect of the present invention, there is provided a magnetic recording medium, comprising:

a substrate; and a Co-containing spinel-type iron oxide thin film formed on the substrate, having a Co content of 1 to 20 mol % based on Fe, a coercive force value of not less than 159 kA/m (2,000 Oe), a thickness of 5 to 200 nm, a center line average height Ra of 0.1 to 0.8 nm and a maximum height (Rmax) of not more than 10 nm.

In a second aspect of the present invention, there is provided a magnetic recording medium, comprising:

a substrate; and a Co-containing spinel-type iron oxide thin film formed on the substrate, comprising magnetite represented by the general formula of $FeO_x \cdot Fe_2O_3$ ($0<x\leq 1$) and maghemite represented by the general formula of $\gamma$-$Fe_2O_3$, and having a Co content of 1 to 20 mol % based on Fe, a coercive force value of not less than 159 kA/m (2,000 Oe), a thickness of 5 to 200 nm, a center line average height Ra of 0.1 to 0.8 nm, a maximum height (Rmax) of not more than 10 nm, a surface electrical resistance value of not more than 1.5 M$\Omega$ and a saturation magnetization value of 29 to 63 Wb/m$^3$ when measured by applying a magnetic field of 1,590 kA/m (20 kOe) thereto.

In a third aspect of the present invention, there is provided a magnetic recording medium, comprising:

a substrate;

an underlayer formed between the substrate and the Co-containing spinel-type iron oxide thin film, said underlayer having a thickness of not more than 200 nm and being ones selected from the group consisting of an oxide thin film having a NaCl-type structure, a metal thin film having a bcc structure, a metal thin film having a B2 structure and an oxide thin film exhibiting an amorphous structure by X-ray analysis; and a Co-containing spinel-type iron oxide thin film formed on the underlayer, having a Co content of 1 to 20 mol % based on Fe, a coercive force value of not less than 159 kA/m (2,000 Oe), a thickness of 5 to 200 nm, a center line average height Ra of 0.1 to 0.8 nm and a maximum height (Rmax) of not more than 10 nm.

In a fourth aspect of the present invention, there is provided a process for producing a magnetic recording medium, comprising:

forming a Co-containing iron oxide thin film on a substrate by sputtering a metal target or a metal alloy target in an atmosphere of plasma activated by an electron cyclotron resonance microwave.

DETAILED DESCRIPTION OF THE INVENTION

Figure 1:
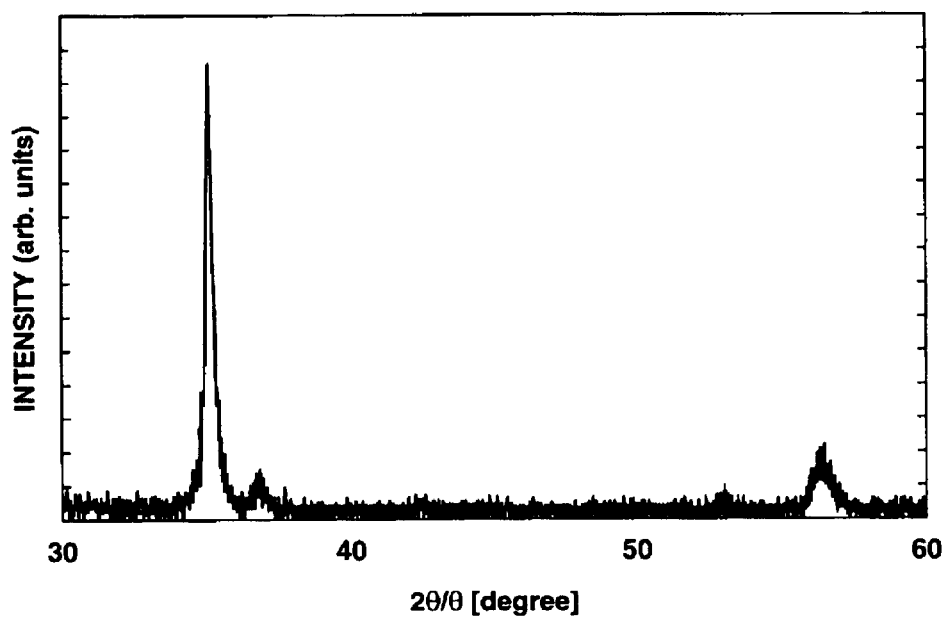
FIG. 1 is a view showing X-ray diffraction patterns of a spinel-type iron oxide thin film formed by the production process according to the present invention.

The present invention will be described in detail below.

First, the magnetic recording medium of the present invention is described.

The magnetic recording medium of the present invention comprises a substrate and a spinel-type iron oxide thin film formed on the substrate.

As the substrate used in the present invention, there may be exemplified silicon substrate, plastic substrates made of polyimide, polyethylene naphthalate (PEN), polyethylene terephthalate (PET), etc., glass substrates or the like. Among these substrates, the glass substrates are preferred in the consideration of surface smoothness.

In the magnetic recording medium of the present invention, an underlayer may be provided between the substrate and the spinel-type iron oxide thin film. When the spinel-type iron oxide thin film is formed on the underlayer, it is possible to prevent respective particles constituting the spinel-type iron oxide thin film from being excessively growth at an initial deposit layer thereof, thereby enabling the noise of the magnetic recording medium to be reduced. Examples of the underlayer may include oxide thin films having a NaCl-type structure, metal thin films having a bcc structure, metal thin film having a B2 structure, oxide thin films exhibiting an amorphous structure by X-ray analysis, or the like. Specific examples of the oxide thin films having a NaCl-type structure may include nickel oxide thin film, magnesium oxide thin film or the like. Specific examples of the oxides thin films having a bcc structure may include chromium metal thin film, Cr—Mo alloy thin film or the like. Specific examples of the metal thin films having a B2 structure may include Ni—Al thin film, Fe—Al thin film or the like. Specific examples of the oxide thin films exhibiting an amorphous structure by X-ray analysis may include $SiO_2$ thin film, $Al_2O_3$ thin film or the like. The thickness of the underlayer used in the present invention is preferably not more than 200 nm, more preferably not more than 100 nm. When the thickness of the underlayer is more than 200 nm, the spinel-type iron oxide thin film formed thereon may be deteriorated in surface smoothness.

The underlayer may be oriented or non-oriented. When the oriented underlayer is used, the obtained spinel-type iron oxide thin film formed thereon is suitably used as longitudinal magnetic recording media or perpendicular magnetic recording media according to the orientation direction of the underlayer.

The spinel-type iron oxide thin film used in the present invention has a thickness of usually 5 to 200 nm, preferably 5 to 150 nm, more preferably 5 to 100 nm. When the thickness of the spinel-type iron oxide thin film is less than 5 nm, it may be difficult to obtain a magnetic recording medium having a coercive force of not less than 159 kA/m (2,000 Oe). When the thickness of the spinel-type iron oxide thin film is more than 200 nm, it may become difficult to uniformly magnetize the magnetic thin film up to a deep portion thereof when signals are recorded thereon, thereby failing to obtain good recording and reproducing characteristics.

The spinel-type iron oxide thin film of the present invention is preferably composed of magnetite represented by the general formula of $FeO_x \cdot Fe_2O_3$ ($0<x \leq 1$) and maghemite represented by the general formula of $\gamma$-$Fe_2O_3$. The ratio (mole ratio) of maghemite to magnetite ($Fe^{3+}/Fe^{2+}$) is from more than 2 to less than 100 ($100>Fe^{3+}/Fe^{2+}>2$).

The spinel-type iron oxide thin film has a Co content of usually 1 to 20 mol %, preferably 1 to 10 mol % based on Fe. When the Co content is less than 1 mol %, it may be difficult to obtain a magnetic recording medium having a coercive force of not less than 159 kA/m (2,000 Oe). When the Co content is more than 20 mol %, it may be difficult to obtain a magnetic recording medium having an excellent stability independent of change with passage of time.

Meanwhile, the spinel-type iron oxide thin film in the present invention may contain, if required, at least one element other than cobalt selected from the group consisting of Mn, Ni, Cu, Ti, B and Zn which may be ordinarily used for improving various properties thereof, in an amount of a molar ratio of the element to Fe of preferably about 0.005:1 to about 0.04:1. The addition of these elements facilitates the production of magnetic recording media having a high coercive force.

Among various parameters of the surface roughness of the spinel-type iron oxide thin film, the center line average height (Ra) thereof is usually 0.1 to 0.8 nm, preferably 0.1 to 0.75 nm; and the maximum height ($R_{max}$) thereof is preferably 1 to 10 nm, more preferably 1 to 9 nm, still more preferably 1 to 8 nm.

The magnetic recording medium of the present invention has a surface electrical resistance value of preferably not more than 1.5MΩ, more preferably not more than 1.2MΩ, still more preferably not more than 1.0M•.

In addition, the magnetic recording medium of the present invention has a coercive force value of preferably not less than 159 kA/m (2,000 Oe), more preferably 167.1 to 1,194 kA/m (2,100 to 15,000 Oe); a saturation magnetization value (value of magnetization when applying a magnetic field of 1,590 kA/m (20 kOe) thereto) of preferably 29 to 63 $Wb/m^3$ (230 to 500 $emu/cm^3$), more preferably 30 to 63 $Wb/m^3$ (240 to 500 $emu/cm^3$), still more preferably 31 to 63 $Wb/m^3$ (250 to 500 $emu/cm^3$).

Next, the process for producing the magnetic recording medium according to the present invention is described.

The magnetic recording medium of the present invention can be produced by forming a spinel-type iron oxide thin film on a substrate by sputtering method using ECR microwave plasma.

The ECR microwave plasma shows a very high ionization degree of about 100% as compared to DC (direct current) or RF (radio frequency) and, therefore, is capable of providing such a plasma having a high activity and a high density. Also, the plasma exhibits a narrow ion energy distribution, thereby realizing a low-temperature process and preventing the deterioration in surface smoothness of the obtained film.

As the target to be sputtered, there may be used metals or metal alloys. Among these targets, metal alloys are preferred. The use of the metal alloys can facilitate the control of composition of the target, and can improve the uniformity of the obtained thin film. As to the composition of the target, cobalt is contained therein in an amount of usually 1 to 20% by weight, preferably 1 to 10% by weight based on the weight of iron. When the Co content is less than 1% by weight, it may become difficult to readily obtain a magnetic recording medium exhibiting a coercive force as high as not less than 159 kA/m (2,000 Oe). When the Co content is more than 20% by weight, it may be difficult to obtain a magnetic recording medium having an excellent stability independent of change with passage of time.

The atmosphere used in the present invention may be a mixed gas comprising oxygen and a rare gas such as helium, argon, xenon, krypton or the like. Among the rare gases, argon is preferred in the consideration of industrial applications. The content of oxygen (amount of oxygen introduced) is preferably 5 to 30% based on the total gas. The content of the rare gas is preferably 70 to 95% based on the total gas. The pressure of the total gas upon the sputtering is preferably 0.01 to 1.0 Pa.

In the present invention, the sputtering may be conducted at a substrate temperature of preferably 20 to 250° C., more preferably 20 to 150° C. Since the spinel-type iron oxide thin film can be sufficiently formed within the above-specified low temperature range, it is not required to raise the substrate temperature to a higher value.

Also, when the underlayer is used, after such an underlayer is formed on the substrate by sputtering method or the like, the spinel-type iron oxide thin film may be formed thereon by the same method as described above.

The point of the present invention is that the spinel-type iron oxide thin film having a relatively high coercive force can be produced by one step process using ECR microwave plasma.

Conventionally, in order to obtain such a spinel-type iron oxide thin film having a relatively high coercive force, it has been required that after forming a magnetite thin film, the obtained magnetite thin film is taken out into atmosphere and subjected to oxidation treatment so as to transform the magnetite thin film into a maghemite thin film. On the other hand, in the present invention, such an aimed thin film can be produced by one step process using ECR microwave plasma, thereby inhibiting adverse influence by contamination or the like, and simplifying the production process. Further, since the thin film can be produced by one step process, the process time can be considerably shortened.

In addition, in the process of the present invention, the thin film can be produced at a relatively low temperature as compared to the conventional methods. Therefore, plastic substrates such as PET substrate, PEN substrate or the like which are not applicable to the conventional methods, can be used in the present invention. As a result, the obtained thin film can be prevented from being deteriorated in magnetic properties due to undesired migration from the substrate.

The reason why the magnetic recording medium of the present invention can show a high coercive force, is considered as follows. That is, it is considered that the reaction sputtering method using high-active ECR microwave plasma as well as an appropriate Co content can contribute to the enhancement in coercive force of the obtained spinel-type iron oxide thin film composed of magnetite and maghemite.

The reason why the magnetic recording medium of the present invention can show an excellent surface smoothness, is considered as follows. That is, since the thin film is produced at a low temperature, the growth of grains can be inhibited.

The magnetic recording medium of the present invention can show not only a relatively high coercive force in spite of its small film thickness, but also an excellent surface smoothness. Therefore, the magnetic recording medium of the present invention is suitable as those for high-density recording.

EXAMPLES

The present invention will be described in more detail by reference to the following examples. However, these examples are only illustrative and not intended to limit the present invention thereto.

Various properties were measured by the following methods.

(1) The thickness of the spinel-type iron oxide thin film was determined as follows. That is, before deposition of the thin film, a line was drawn with a felt pen on a substrate. Then, after deposition of the thin film on the substrate, the underlying line was removed using an organic solvent, thereby simultaneously removing the deposited film. The thus formed stepped portion was measured by a tracer-type surface roughness tester (manufactured by DEKTAK Co., Ltd.). The thickness of the thin film was calculated from the measured value.

(2) The surface electrical resistivity of the spinel-type iron oxide thin film was measured by an Insulation Tester DM-1527 (manufactured by Sanwa Denki Keiki Co., Ltd.) by setting the distance between two probes to 10 mm.

(3) The X-ray diffraction patterns of the respective thin films are expressed by values measured by "X-Ray Diffractometer RINT 2000" (manufactured by RIGAKU DENKI CO., LTD.).

The measuring conditions of the X-ray diffraction patterns were as follow:

Tube used: Cu; tube voltage: 40 kV; tube current: 200 mA; sampling width of vertical type goniometer: 0.0200; light-emitting (divergent) slit: 0.2 mm; scattering slit: OPEN; light-receiving slit: 5.0 mm; incident angle (0): 0.20; diffraction angle (2θ): 30.00° to 60.00°.

(4) The surface roughness (center line average height ($R_a$) and maximum height ($R_{max}$)) of the spinel-type iron oxide thin film was measured using an atomic force microscope (manufactured by Digital Instruments (D.I.)), and evaluated with respect to a 5 μm-square area of each film.

(5) The magnetic properties such as coercive force, saturation magnetization and the like of the magnetic recording medium, are expressed by values measured by "Vibrating Sample Magnetometer VSM" (manufactured by TOEI KOGYO CO., LTD.). The magnetic properties of the magnetic recording medium were measured by applying a maximum magnetic field of 1,590 kA/m (20 kOe) thereto.

Example 1

<Production of magnetic recording medium>

By using a microwave vertical introduction-type ECR sputtering apparatus "AFTEX-3400U" (manufactured by AFTY CO., LTD.), and setting a distance between a glass substrate and a metal alloy target to 175 mm, the metal alloy target composed of 94% of Fe and 6% of Co was sputtered at 50° C. in a mixed gas atmosphere containing 13% of oxygen and 87% of argon and having an oxygen flow rate of 2 CCM, an oxygen partial pressure of 0.011 Pa and a total pressure of 0.08 Pa, thereby sputtering a Co-containing spinel-type iron oxide thin film having a thickness of 50 nm at a deposition rate of 3.5 nm/minute on the glass substrate.

The thus obtained Co-containing spinel-type iron oxide thin film had a thickness of 50 nm, a surface roughness represented by a center line average height ($R_a$) of 0.37 nm and a maximum height ($R_{max}$) of 5.15 nm, a coercive force of 227 kA/m (2,854 Oe), a coercive force squareness (S* value) of 0.59, and a surface electrical resistance of 0.6 M•.

Examples 2 to 10 and Comparative Examples 1 to 4

The same procedure as defined in Example 1 was conducted except that substrate used, use or non-use of underlayer, kind and thickness of underlayer used, composition of metal alloy target, plasma source used upon sputtering, substrate temperature upon film formation and use or non-use of oxidation treatment process, were changed variously, thereby obtaining magnetic recording media.

Meanwhile, in Comparative Examples 1 and 2, the magnetic recording media were produced by forming the magnetite thin film on the substrate by sputtering method using RF plasma. In Comparative Example 3, after the magnetite thin film was deposited in the same method as in Comparative Example 1, the obtained magnetite thin film was subjected to oxidation treatment by irradiating ECR oxygen plasma thereto at a substrate temperature of 150° C., thereby obtaining a magnetic recording medium. In Comparative Example 4, after the magnetite thin film was formed in the same method as in Comparative Example 1, the obtained magnetite thin film was subjected to oxidation treatment in atmospheric air at 320° C., thereby obtaining a magnetic recording medium.

The production conditions are shown in Table 1, and various properties of the obtained magnetic recording media are shown in Table 2.

TABLE 1

| Examples and Comparative Examples | Substrate | Underlayer Kind | Thickness (nm) | Composition of target (ratio of Fe:Co) |
|---|---|---|---|---|
| Example 1 | Glass | — | — | 94:6 |
| Example 2 | Glass | — | — | 94:6 |
| Example 3 | Glass | — | — | 94:6 |
| Example 4 | Glass | — | — | 97:3 |
| Example 5 | Glass | — | — | 92:8 |
| Example 6 | Si | — | — | 94:6 |
| Example 7 | Polyimide | — | — | 94:6 |
| Example 8 | Glass | NiO | 100 | 94:6 |
| Example 9 | Glass | Cr | 100 | 94:6 |
| Example 10 | Glass | SiO$_2$ | 100 | 94:6 |
| Comparative Example 1 | Glass | — | — | 95:5 |
| Comparative Example 2 | Glass | — | — | 95:5 |
| Comparative Example 3 | Glass | — | — | 95:5 |
| Comparative Example 4 | Glass | — | — | 95:5 |

| Examples and Comparative Examples | Plasma source upon sputtering | Substrate temperature upon film formation (°C.) | Oxidation treatment Process | Substrate temperature (°C.) |
|---|---|---|---|---|
| Example 1 | ECR | 50 | — | — |
| Example 2 | ECR | 50 | — | — |
| Example 3 | ECR | 100 | — | — |
| Example 4 | ECR | 50 | — | — |
| Example 5 | ECR | 50 | — | — |
| Example 6 | ECR | 50 | — | — |
| Example 7 | ECR | 50 | — | — |
| Example 8 | ECR | 50 | — | — |
| Example 9 | ECR | 65 | — | — |
| Example 10 | ECR | 150 | — | — |
| Comparative Example 1 | RF | 200 | — | — |
| Comparative Example 2 | RF | 200 | — | — |
| Comparative Example 3 | RF | 200 | Irradiation with ECR oxygen plasma | 150 |
| Comparative Example 4 | RF | 200 | Heat-treatment in air | 320 |

TABLE 2

| Examples and Comparative Examples | Magnetic recording medium Product | Co content (molar ratio: Fe:Co) | Film thickness (nm) |
|---|---|---|---|
| Example 1 | Spinel-type iron oxide | 1:0.06 | 50 |
| Example 2 | Spinel-type iron oxide | 1:0.06 | 100 |
| Example 3 | Spinel-type iron oxide | 1:0.06 | 50 |
| Example 4 | Spinel-type iron oxide | 1:0.03 | 50 |
| Example 5 | Spinel-type iron oxide | 1:0.08 | 50 |
| Example 6 | Spinel-type iron oxide | 1:0.06 | 50 |
| Example 7 | Spinel-type iron oxide | 1:0.06 | 50 |
| Example 8 | Spinel-type iron oxide | 1:0.06 | 50 |
| Example 9 | Spinel-type iron oxide | 1:0.06 | 50 |
| Example 10 | Spinel-type iron oxide | 1:0.06 | 70 |
| Comparative Example 1 | Magnetite | 1:0.05 | 50 |
| Comparative Example 2 | Magnetite | 1:0.05 | 100 |
| Comparative Example 3 | Maghemite | 1:0.05 | 50 |
| Comparative Example 4 | Maghemite | 1:0.05 | 50 |

| Examples and Comparative Examples | Magnetic recording medium Surface electrical resistivity (MΩ) | Saturation magnetization Wb/m$^3$ | Saturation magnetization emu/cm$^3$ |
|---|---|---|---|
| Example 1 | 0.6 | 48 | 380 |
| Example 2 | 0.4 | 43 | 338 |
| Example 3 | 0.1 | 61 | 481 |
| Example 4 | 1.2 | 33 | 263 |
| Example 5 | 0.8 | 34 | 272 |
| Example 6 | 1 | 30 | 235 |
| Example 7 | 0.1 | 39 | 311 |
| Example 8 | 0.2 | 42 | 331 |
| Example 9 | 0.1 | 47 | 369 |
| Example 10 | 0.8 | 31 | 245 |
| Comparative Example 1 | 0.07 | 45 | 354 |
| Comparative Example 2 | 0.05 | 40 | 320 |
| Comparative Example 3 | 40 | 37 | 297 |
| Comparative Example 4 | 220 | 32 | 255 |

| Examples and Comparative Examples | Coercive force kA/m | Coercive force Oe | Surface roughness Ra (nm) | Surface roughness Rmax (nm) |
|---|---|---|---|---|
| Example 1 | 227 | 2,854 | 0.37 | 5.15 |
| Example 2 | 229 | 2,883 | 0.58 | 6.77 |
| Example 3 | 242 | 3,035 | 0.51 | 6.25 |
| Example 4 | 189 | 2,374 | 0.44 | 6.89 |
| Example 5 | 247 | 3,108 | 0.48 | 6.69 |
| Example 6 | 186 | 2,339 | 0.25 | 4.48 |
| Example 7 | 169 | 2,123 | 0.74 | 8.89 |
| Example 8 | 169 | 2,126 | 0.40 | 7.60 |
| Example 9 | 213 | 2,680 | 0.45 | 6.11 |
| Example 10 | 196 | 2,463 | 0.56 | 7.78 |
| Comparative Example 1 | 49 | 610 | 0.70 | 7.75 |
| Comparative Example 2 | 46 | 574 | 0.98 | 11.21 |
| Comparative Example 3 | 258 | 3,235 | 0.87 | 9.47 |
| Comparative Example 4 | 328 | 4,115 | 1.22 | 12.13 |

What is claimed is:

1. A magnetic recording medium, comprising:
   a substrate; and
   a Co-containing spinel-based iron oxide thin film formed on the substrate, comprising magnetite represented by the general formula of FeO$_x$·Fe$_2$O$_3$ (0<x·1) and maghemite represented by the general formula of γ-Fe$_2$O$_3$, and having a Co content of 1 to 20 mol % based on Fe, a coercive force value of not less than 159 kA/m (2,000 Oe), a thickness of 5 to 200 nm, a center line average height Ra of 0.1 to 0.8 nm, a maximum height (Rmax) of not more than 10 nm, a surface electrical resistance value of not more than 1.5 MΩ and a saturation magnetization value of 29 to 63 Wb/m$^3$ when measured by applying a magnetic field of 1,590 kAfm (20 kOe) thereto.

2. A magnetic recording medium, comprising:

a substrate; and a Co-containing spinel-based iron oxide thin film formed on the substrate, having a Co content of 1 to 20 mol % based on Fe, a thickness of 5 to 200 nm, a center line average height Ra of 0.1 to 0.8 nm, a maximum height (Rmax) of not more than 10 nm, a surface electrical resistance value of not more than 1.5 MΩ, a coercive force value of not less than 159 kA/m (2,000 Oe) and when measured by applying a magnetic field of 1,590 kA/m (20 kOe) thereto, a saturation magnetization value of 29 to 63 Wb/m$^3$.

3. A magnetic recording medium according to claim 2, wherein said spinel-based iron oxide thin film comprises magnetite represented by the general formula of FeO$_x$·Fe$_2$O$_3$ (0<x·1) and maghemite represented by the general formula of γ-Fe$_2$O$_3$.

4. A magnetic recording medium according to claim 2, further comprising an underlayer formed between the substrate and the Co-containing spinel-based iron oxide thin film, said underlayer having a thickness of not more than 200 nm and being one selected from the group consisting of an oxide thin film having a NaCl-based structure, a metal thin film having a bcc structure, a metal thin film having a B2 structure and an oxide thin film exhibiting an amorphous structure by X-ray analysis.

5. A magnetic recording medium according to claim 4, wherein said underlayer is one selected from the group consisting of nickel oxide thin film, magnesium oxide thin film, chromium metal thin film, Cr—Mo alloy thin film, Ni—Al thin film, Fe—Al thin film, SiO$_2$ thin film and Al$_2$O$_3$ thin film.

6. A magnetic recording medium, comprising:

a substrate;

an underlayer formed between the substrate and the Co-containing spinel-based iron oxide thin film, said underlayer having a thickness of not more than 200 nm and being one selected from the group consisting of an oxide thin film having a NaCl-based structure, a metal thin film having a bcc structure, a metal thin film having a B2 structure and an oxide thin film exhibiting an amorphous structure by X-ray analysis; and a Co-containing spinel-based iron oxide thin film formed on the underlayer, having a Co content of 1 to 20 mol % based on Fe, a thickness of 5 to 200 nm, a center line average height Ra of 0.1 to 0.8 nm and a maximum height (Rmax) of not more than 10 nm, a surface electrical resistance value of not more than 1.5 MΩ, a coercive force value of not less than 159 kA/m and when measured by applying a magnetic field of 1,590 kA/m (20 kOe) thereto, a saturation magnetization value of 29 to 63 Wb/m$^3$.

\* \* \* \* \*